US008432890B2

(12) United States Patent
Gruber

(10) Patent No.: US 8,432,890 B2
(45) Date of Patent: *Apr. 30, 2013

(54) MOBILE RADIO COMMUNICATION SYSTEM

(75) Inventor: Roland Gruber, Sauerlach (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,946

(22) Filed: Aug. 17, 2011

(65) Prior Publication Data

US 2011/0300864 A1 Dec. 8, 2011

Related U.S. Application Data

(63) Continuation of application No. 11/346,997, filed on Feb. 3, 2006, now Pat. No. 8,023,491.

(30) Foreign Application Priority Data

Feb. 4, 2005 (DE) .......................... 10 2005 005 254

(51) Int. Cl.
*H04J 3/24* (2006.01)
(52) U.S. Cl.
USPC ........................................ 370/349; 455/552.1
(58) Field of Classification Search .................. 370/349, 370/389; 455/552.1, 435.1, 435.2; 709/245
See application file for complete search history.

(56) References Cited

U.S. PATENT DOCUMENTS

| 2002/0001298 | A1* | 1/2002 | Tourunen et al. | ............. 370/349 |
| 2004/0127238 | A1 | 7/2004 | Bianconi et al. | |
| 2004/0258019 | A1 | 12/2004 | Haumont et al. | ............. 370/331 |
| 2005/0026646 | A1 | 2/2005 | Naim et al. | ................ 455/552.1 |
| 2012/0057582 | A1 | 3/2012 | Purkayastha et al. | |

FOREIGN PATENT DOCUMENTS

| EP | 1 494 494 A2 | 1/2005 |
| WO | WO 02/01895 A1 | 1/2002 |

OTHER PUBLICATIONS

Universal Mobile Telecommunications System (UMTS): Radio Ressource Control (RRC) protocol specification (3GPP TS 25.331 version 5.0.9. (Release 5), ETSI TS 125 331 V5.0.0 (Mar. 2002).
3rd Generation Partnership Project; Technical Specification Group GSM EDGE Radio Access Network; Mobile Station—Base Station System (MS-BSS) interface; Data Link (DL) layer specification (Release 5), 3GPP TS 44.006 V5.0.0 (Sep. 2002).
3rd Generation Partnership Project; Technical Specification Group Core Network, Mobile radio interface Layer 3 specification; Core network protocols; Stage 3 (Release 6), 3GPP TS 24.008 V6.0.0 (Mar. 2003).

* cited by examiner

*Primary Examiner* — Phuoc Doan
(74) *Attorney, Agent, or Firm* — Dickstein Shapiro LLP

(57) ABSTRACT

A mobile radio communication system having a mobile radio communication network and a mobile radio subscriber appliance, wherein a unit in the network layer of the core network of the mobile radio communication network is configured to transmit to the mobile radio subscriber appliance a first message, based on an occurrence of a predetermined event, with a request for a statement which describes at least one radio characteristic of the mobile radio subscriber appliance.

30 Claims, 2 Drawing Sheets

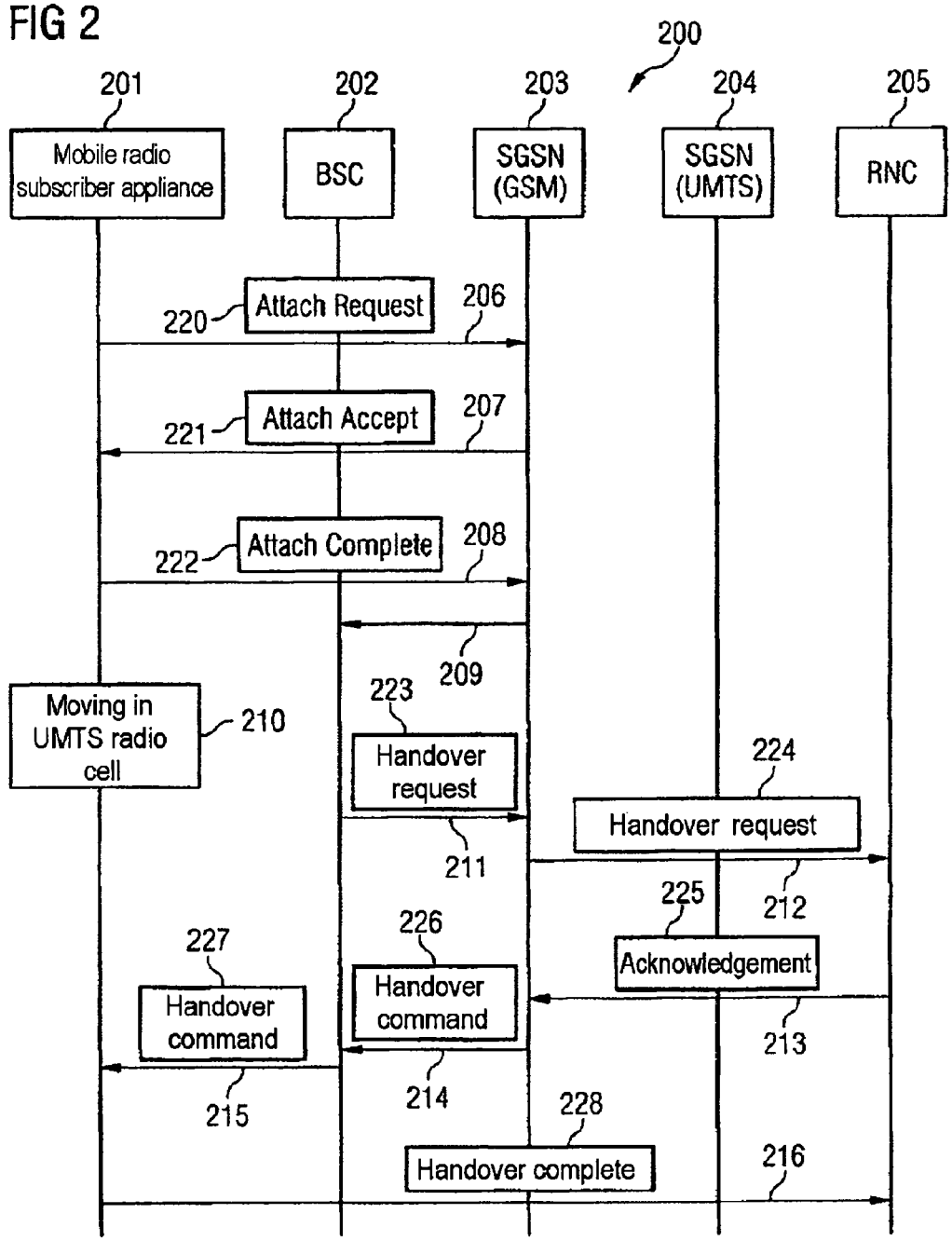

MOBILE RADIO COMMUNICATION SYSTEM

CROSS-REFERENCE TO RELATED APPLICATION

This application is a continuation of U.S. patent application Ser. No. 11/346,997, which was filed Feb. 3, 2006, and which claims priority to German Patent Application Serial No. 10 2005 005 254.1-42, which was filed on Feb. 4, 2005. These patent application are incorporated herein by reference in their entireties.

FIELD OF THE APPLICATION

The application relates to a mobile radio communication system, a method for operation of a mobile radio communication system, a core network network-layer unit and a method for operation of a core network network-layer unit.

BACKGROUND

In the course of further development of mobile radio communication systems, work is currently being undertaken to replace the mobile radio communication systems based on the GSM (Global System for Mobile Communications) standard with the more powerful mobile radio communication systems based on the UMTS (Universal Mobile Telecommunication System) standard.

Since the network coverage achieved using UMTS mobile radio networks, that is to say mobile radio communication systems based on the UMTS standard, is not yet as far advanced as the network coverage achieved using the existing GSM mobile radio networks, that is to say mobile radio communication systems based on the GSM standard, it is possible to use UMTS mobile radio networks only in particular geographical areas for communication services, while other geographical areas have only GSM mobile radio networks available. Accordingly, the situation may arise in which a user of a mobile radio subscriber appliance is using a GSM mobile radio network to use a communication service and moves into the domain of a UMTS radio cell, that is to say into a geographical area in which a UMTS mobile radio network can be used, and, because the reception quality of the UMTS mobile radio network is higher there than the reception quality of the GSM mobile radio network, for example, or because a higher data rate can be achieved in the communication service when using the UMTS mobile radio network, the user now wishes to use the communication service using the UMTS mobile radio network, or because the user wishes to use a communication service which is provided only by means of the UMTS mobile radio network.

A change of mobile radio network used to provide a communication service or to provide a communication link is called inter-system handover of the communication service or of the communication link. In the described case of a change from a GSM mobile radio network to a UMTS mobile radio network, this is specifically inter-system handover from a GERAN (GSM EDGE Radio Access Network; EDGE: Enhanced Data Rates For GSM Evolution) to a UTRAN (Universal Terrestrial Radio Access Network).

When a communication service is provided using a packet-switched communication link, for example when the communication service involves allowing a user to transmit data between the user's mobile radio subscriber appliance in the Internet, handover is referred to as packet-switched handover for the communication service or the communication link.

In the case of inter-system handover for a packet-switched communication link, that is to say packet-switched inter-system handover, from a GERAN to a UTRAN, it is necessary for the UTRAN, that is to say the radio access network of the UMTS mobile radio network, to have some information specific to the mobile radio subscriber appliance in order to be able to perform the inter-system handover.

This information is defined in the RRC (Radio Resource Control) container INTER RAT HANDOVER INFO, which contains the RAC (Routing Area Code) for the mobile radio subscriber appliance and the parameter START PS, an input parameter which is stored on the USIM (Universal Subscriber Identity Module) for the encryption algorithm used in the PS (packet-switched) domain, see 3GPP TS 25.331; 3rd Generation Partnership Project; Technical Specification Group Radio Access Network; Radio Resource Control (RRC); Protocol Specification (Release 5).

This information, which is subsequently called the required information, needs to be available in the UTRAN, that is to say in an RNC (Radio Network Controller) for the UTRAN, no later than when a GERAN node, that is to say a BSC (Base Station Controller) for the GERAN, requests the inter-system handover.

Among the required information, particularly the UTRAN capabilities (parameters specifying the extent to which the mobile radio subscriber appliance is UMTS-compatible) specific to the mobile radio subscriber appliance represent a significant volume of data (compared with the other signaling data).

In the course of the development for performing packet-switched inter-system handover, carried out as part of the 3GPP (Third Generation Partnership Project) standardization work, no solution has currently been provided for the problem of transmitting the required information. There are currently two proposals:

1. The mobile radio subscriber appliance transmits the required information as part of the GMM (GPRS Mobility Management; GPRS: General Packet Radio Service) registration request messages, that is to say using an Attach Request message or a Routing Area Update Request message, to the SGSN (Serving GPS Support Node) associated with the mobile radio subscriber appliance in the core network of the GSM mobile radio network. The SGSN stores the information and forwards it to the GERAN.

A drawback of this procedure is that the mobile radio subscriber appliance has no information about whether the GSM mobile network supports packet-switched inter-system handover to a UMTS mobile radio network, and the information is therefore always transmitted and forwarded, even if the GSM mobile radio network does not support packet-switched inter-system handover to a UMTS mobile radio network. In addition, this means that the information is repeatedly transmitted to the SGSN unnecessarily when the location within the SGSN's territory changes.

2. The GERAN node, that is to say the BSC associated with the mobile radio subscriber appliance in the GERAN, uses the RLC/MAC signaling radio link to request the required information from the mobile radio subscriber appliance immediately before the packet-switched inter-system handover to the UMTS mobile radio network is carried out.

The mobile radio subscriber appliance transmits the required information to the GERAN node using the RLC/MAC signaling radio link.

A drawback of this procedure is that the conventional RLC/MAC protocol allows only small volumes of data to be transmitted (25 octets per message), which is not sufficient for transmitting the required information. Extending the RLC/

MAC protocol so that the mobile radio subscriber appliance can transmit specific information is involved and complex. In addition, the request for the required information immediately before the inter-system handover (a just-in-time request) increases the probability that the inter-system handover will fail or that errors will occur, since a significant delay can arise. In addition, this procedure requires the information to be transmitted using the radio interface upon each inter-system handover, which results in significant signaling involvement.

WO 02/01895 A1 discloses a method in which the information about the compression algorithms supported by a mobile radio subscriber appliance is transmitted to an RNC (Radio Network Controller) when a radio bearer is set up.

EP 1494494 A2 discloses a method for handover of a terminal to a UTRAN in which a mobile terminal transmits information to the UTRAN which relates to handover of circuit-switched communication links, and transmits no information relating to handover by packet-switched communication links.

SUMMARY

The application is based on the problem of providing a method, which is improved over the prior art, for transmitting a mobile radio subscriber appliance's specific information required for inter-system handover.

The problem is solved by a mobile radio communication system, a method for operation of a mobile radio communication system, a core network network-layer unit and a method for operation of a core network network-layer unit.

The application describes a mobile radio communication system having a mobile radio communication network and a mobile radio subscriber appliance, where the mobile radio communication network has a radio access network and a core network. A unit in the network layer of the core network is configured to transmit to the mobile radio subscriber appliance a first message, based on an occurrence of a predetermined event, with a request for a statement which describes at least one radio characteristic of the mobile radio subscriber appliance, and the mobile radio subscriber appliance is configured to transmit to the unit a second message with the statement which describes the at least one radio characteristic of the mobile radio subscriber appliance.

The application also describes a method for operating a mobile radio communication system having a mobile radio communication network and a mobile radio subscriber appliance, where the mobile radio communication network has a radio access network and a core network, and where the method involves a unit in the network layer of the core network transmitting to the mobile radio subscriber appliance a first message, based on an occurrence of a predetermined event, with a request for a statement which describes at least one radio characteristic of the mobile radio subscriber appliance, and the mobile radio subscriber appliance transmitting to the unit a second message with the statement which describes the at least one radio characteristic of the mobile radio subscriber appliance.

The application also describes a core network network-layer unit in a mobile radio communication network which has a core network and a radio access network, which unit is configured to transmit to the mobile radio subscriber appliance a first message, based on an occurrence of a predetermined event, with a request for a statement which describes at least one radio characteristic of a mobile radio subscriber appliance, and to receive a second message, sent by the mobile radio subscriber appliance, with the statement which describes the at least one radio characteristic of the mobile radio subscriber appliance.

The application also describes a method for operating a core network network-layer unit in a mobile radio communication network which has a core network and a radio access network, where the method involves the core network network-layer unit transmitting to the mobile radio subscriber appliance a first message, based on an occurrence of a predetermined event, with a request for a statement which describes at least one radio characteristic of a mobile radio subscriber appliance, and receiving a second message, sent by the mobile radio subscriber appliance, with the statement which describes the at least one radio characteristic of the mobile radio subscriber appliance.

Clearly, the request for the statement which describes at least one radio characteristic of the mobile radio subscriber appliance is made by a unit which is part of a higher layer of the communication layer model used than the unit used for this on the basis of the prior art, namely the network layer. In contrast to the prior art, particularly the request for the statement which describes at least one radio characteristic of the mobile radio subscriber appliance is not made by a unit in the radio access network but rather by a unit in the core network. In addition, the request is made only when a predetermined event occurs, for example when the mobile radio subscriber appliance registers in the core network or when it is established that the mobile radio subscriber appliance has moved into a geographical area in which a UMTS mobile radio network is available.

However, the statement which describes at least one radio characteristic of the mobile radio subscriber appliance does not need to be requested and transmitted whenever the predetermined event occurs, for example whenever the mobile radio subscriber appliance registers in the core network, but rather only when the unit in the network layer which is associated with the mobile radio subscriber appliance changes.

If the mobile radio communication network is a GSM mobile radio communication network, for example, that is to say is a mobile radio communication network based on the GSM (Global EDGE System for Mobile Communications) standard, and if the unit in the network layer is an SGSN (Serving GPRS Support Node; GPRS: General Packet Radio Service) then the statement is requested and transmitted again only when the SGSN associated with the mobile radio subscriber appliance has changed (inter-SGSN change).

In this case, particularly the statement which describes at least one radio characteristic of the mobile radio subscriber appliance is not requested by the GERAN (GSN EDGE Radio Access Network; EDGE: Enhanced Data Rates for GSM Evolution) of the GSM radio communication network, but rather by the core network of the GSM mobile radio communication network.

In addition, the unit in the network layer requests a statement which describes at least one radio characteristic of the mobile radio subscriber appliance only when this is necessary, for example when (in the case of a GSM mobile radio communication network) the GSM mobile radio communication network supports inter-system handover to a UMTS mobile radio communication network.

Since the SGSN associated with the mobile radio subscriber appliance changes relatively rarely, the radio characteristics of the mobile radio subscriber appliance are requested and transmitted only relatively rarely, in comparison with the procedure in which the statement which describes at least one radio characteristic of the mobile radio subscriber appliance is requested and stored by the GERAN.

The result of what has been said is that the signaling involvement for the statement which describes at least one radio characteristic of the mobile radio subscriber appliance is low in comparison with the prior art, which means that significant advantages are obtained for the operator of the mobile radio communication network—in particular the network operator can save costs.

By way of example, the statement which describes at least one radio characteristic of the mobile radio subscriber appliance is the radio characteristic itself or an index specifying a radio characteristic, for example including an index specifying the type of mobile radio subscriber appliance, so that the index can be used to ascertain the radio characteristic or the radio characteristics of the mobile radio subscriber appliance.

The further refinements which are described in connection with the mobile radio communication system apply mutatis mutandis also to the method for operation of a mobile radio communication system, to the core network network-layer unit and to the method for operation of a core network network-layer unit.

It is preferred for the predetermined event to be the registration of the mobile radio subscriber appliance in the core network.

By way of example, the predetermined event is the initiation of a GPRS Attach procedure by the mobile radio subscriber appliance or the initiation of a Registration Area Update procedure by the mobile radio subscriber appliance.

The statement which describes at least one radio characteristic of the mobile radio subscriber appliance can thus be transmitted as part of a registration procedure, so that no additional messages need to be transmitted and the signaling involvement remains low.

It is also preferred for the unit in the network layer also to be configured to store the statement which describes at least one radio characteristic of the mobile radio subscriber appliance.

It is also preferred for the mobile radio communication system to have a further mobile radio network having a further radio access network and having a further core network, and for the unit in the network layer also to be configured to transmit to a further unit in the network layer of the further core network the statement which describes at least one radio characteristic of the mobile radio subscriber appliance upon inter-system handover of the mobile radio subscriber appliance from the mobile radio network to the further mobile radio network.

Clearly, the statement which describes at least one radio characteristic of the mobile radio subscriber appliance is transmitted, in the event of inter-system handover, from the unit in the network layer (of the core network of the mobile radio network from which the inter-system handover takes place, for example from the SGSN of a GSM mobile radio network) to the unit in the network layer of the core network of the mobile radio network to which the inter-system handover takes place (for example to an SGSN in a UMTS mobile radio network).

Preferably, the further unit in the network layer is configured to transmit to the further radio access network the statement which describes at least one radio characteristic of the mobile radio subscriber appliance.

Preferably, the further mobile radio communication network is designed on the basis of the UMTS (Universal Mobile Telecommunication System) standard.

Preferably, the mobile radio communication network is also designed on the basis of the GSM standard.

Clearly, the subject matter described in the application is preferably used for inter-system handover from a GSM mobile radio network to a UMTS mobile radio network.

It is also preferred for the unit in the network layer to be an SGSN.

Preferably, the predetermined event is activation of the mobile radio subscriber appliance at the SGSN.

BRIEF DESCRIPTION OF THE DRAWINGS

Exemplary embodiments are illustrated in the figures and are explained in more detail below.

FIG. 2 shows a message flowchart based on an exemplary embodiment.

DETAILED DESCRIPTION OF PREFERRED EMBODIMENTS

Figure 1:
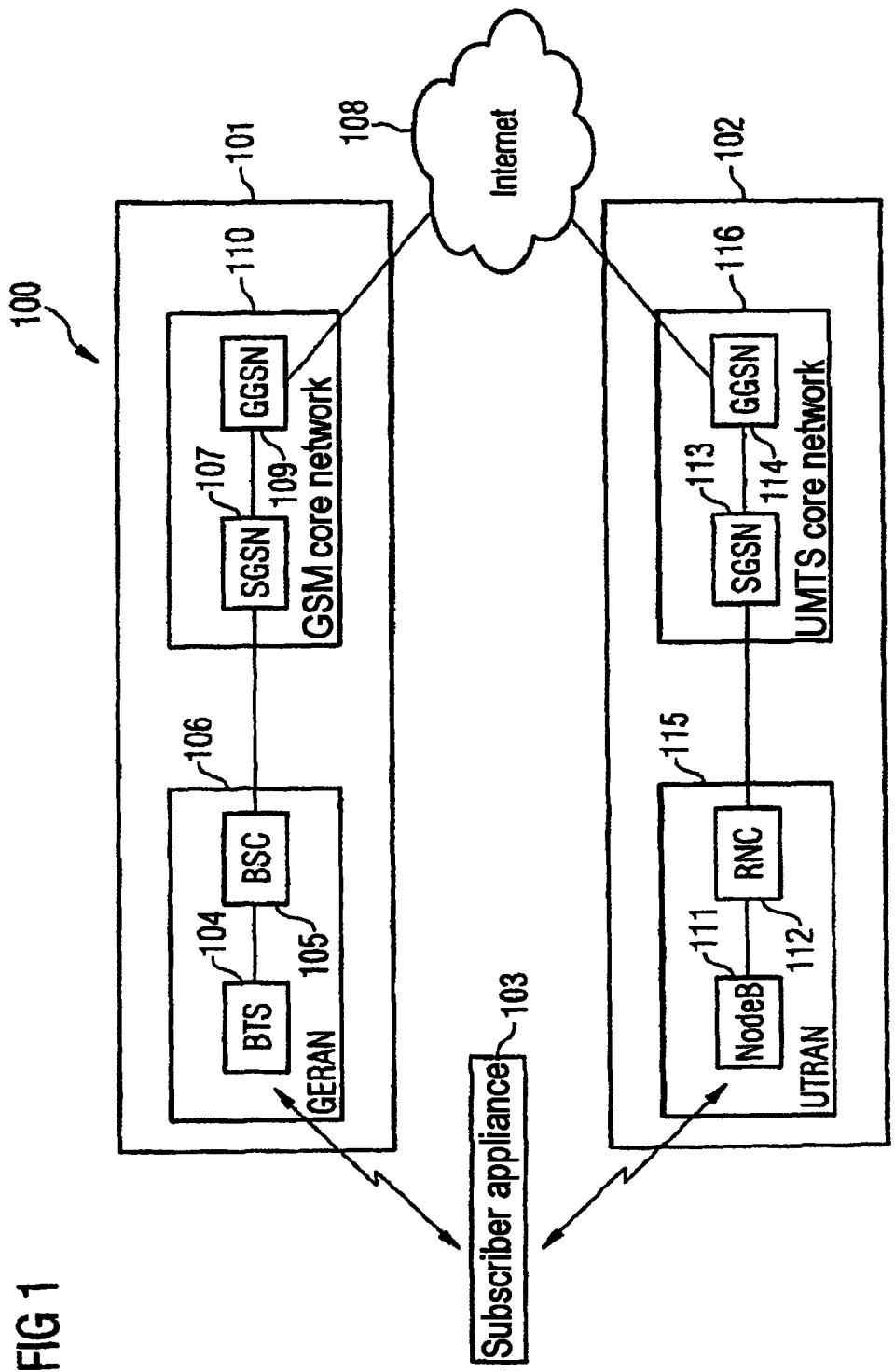
FIG. 1 shows a communication system based on an exemplary embodiment.

FIG. 1 shows a communication system 100 based on an exemplary embodiment.

The communication system 100 has a GSM (Global System for Mobile Communications) mobile radio network 101 and a UMTS (Universal Mobile Telecommunication System) mobile radio network 102.

A mobile radio subscriber appliance 103 is both GSM compatible and UMTS compatible. That is to say that the mobile radio subscriber appliance 103 can set up radio communication links to the GSM mobile radio network 101 and can set up radio communication links to the UMTS mobile radio network 102.

When a radio communication link has been set up between the mobile radio subscriber appliance 103 and the GSM mobile radio network, it is provided by the GSM mobile radio network using a BTS (Base Transceiver Station) 104, a base station in the GSM mobile radio network 101. The BTS 104 is coupled to a BSC (Base Station Controller) 105 and is managed by it. The BTS 104 and the BSC 105 are part of the GERAN (GSM Edge Radio Access Network; EDGE: Enhanced Data Rate for GSM Evolution) 106 of the GSM mobile radio network 101. The GERAN 106 is the radio access network of the GSM mobile radio network 101.

So that the GSM mobile radio network 101 is able to provide, in particular, packet-switched communication links and packet-switched communication services, for example data transfers to and from the Internet 108, the BSC 105 is coupled to a first SGSN (Serving GPRS Support Node) 107. The first SGSN 107 is coupled to a first GGSN (Gateway GPRS Support Node) 109, which is coupled to the Internet 108 and has the functionality of a gateway.

The first SGSN 107 and the first GGSN 109 are part of the core network 110 of the GSM mobile radio network 101.

When a radio communication link has been set up between the mobile radio subscriber appliance 103 and the UMTS mobile radio network 102, it is provided by means of a NodeB 111, a UMTS base station. The NodeB 111 is managed by an RNC (Radio Network Controller) 112. So that the UMTS mobile radio network 102 is able to provide packet-switched communication links and packet-switched communication services, for example data transfers to and from the Internet 108, the RNC 112 is coupled to a second SGSN 113. The second SGSN 113 is coupled to a second GGSN 114, which in similar fashion to the first GGSN 109 has the functionality of a gateway and is coupled to the Internet 108.

The NodeB 111 and the RNC 112 are part of the UTRAN (Universal Terrestrial Radio Access Network) 115 in the UMTS mobile radio network 102. The UTRAN 115 is the radio access network of the UMTS mobile radio network 102.

The second SGSN 113 and the second GGSN 114 are part of the core network 116 of the UMTS mobile radio network 102.

The first SGSN 107 and the second SGSN 113 are coupled to one another. In one embodiment, the first SGSN 107 and the second SGSN 113 are one and the same SGSN (shared SGSN).

When a packet-switched communication link has been set up from the mobile radio subscriber appliance 103 to the Internet 108, for example, using a radio communication link to the GSM mobile radio network 101, it is possible, if the mobile radio subscriber appliance 103 is in the domain of the UMTS mobile radio network 102, to clear down the radio communication link to the GSM mobile radio network 101, and the packet-switched communication link can be extended to the UMTS mobile radio network 102 using a radio communication link which has just been set up. That is to say that it is possible to perform inter-system handover of the packet-switched communication link from the GSM mobile radio network 101 to the UMTS mobile radio network 102, or in other words inter-system handover of the packet-switched communication link from the GERAN 106 to the UTRAN 115.

To be able to perform such inter-system handover, however, it is necessary for the RNC 112 to have information specific to the mobile radio subscriber appliance 103. By way of example, as in 3GPP TS 25.331; 3rd Generation Partnership Project; Technical Specification Group Radio Access Network; Radio Resource Control (RRC); Protocol Specification (Release 5), section 10.3.3.42, this information is:

This information is subsequently called the required information (for inter-system handover).

In the case of the exemplary embodiment explained below, the information specific to the mobile radio subscriber appliance 201 which the RNC 205 needs to know for inter-system handover between the GERAN 106 and UTRAN 115 is transmitted as part of a GPRS Attach to the first SGSN 203 and is forwarded from there to the RNC 205.

FIG. 2 shows a message flowchart 200 based on an exemplary embodiment.

The message flow shown takes place between a mobile radio subscriber appliance 201, a BSC 202, a first SGSN 203, a second SGSN 204 and an RNC 205, which are arranged and in form explained with reference to FIG. 1.

It is assumed that a first radio communication link has been set up from the mobile radio subscriber appliance 201 to the GSM mobile radio network 101.

In step 206, the mobile radio subscriber appliance 201 transmits an Attach Request message 220 to the first SGSN 203, which message contains the request for a GPRS Attach for the mobile radio subscriber appliance 201, that is to say registration of the mobile radio subscriber appliance 201 at the first SGSN 203.

The Attach Request message 220 is a conventional Attach Request message for requesting a GPRS Attach and is in form described in 3GPP TS 24.008 V6.7.0; 3rd Generation Partnership Project; Technical Specification Group Core Network; Mobile radio interface Layer 3 specification; Core network protocols; Stage 3 (Release 6), for example.

It is assumed that the GPRS Attach for the mobile radio subscriber appliance 201 is successful at the first SGSN 203.

| Information Element/Group name | Need | Type and reference | Semantics description |
|---|---|---|---|
| Access stratum release indicator | MP | Enumerated (R99) | Indicates the release of the UE according to [35]. The IE also indicates the release of the RRC transfer syntax supported by the UE |
| | CV-not_rr c_connection SetupC complete | Enumerated (REL-4, REL-5 REL-6) | 13 spare values are needed. |
| DL capability with simultaneous HS-DSCH configuration | OP | Enumerated (32 kbps) 64 kbps, 128 kbps, 384 kbps) | |
| PDCP capability | MP | PDCP capability 10.3.3.24 | |
| RLC capability | MP | RLC capability 10.3.3.34 | |
| Transport channel capability | MP | Transport channel capability 10.3.3.40 | |
| RF capability FDD | OP | RF capability FDD 10.3.3.33 | |
| RF capability TDD | OP | RF capability TDD 10.3.3.33b | One "TDD RF capability" entity shall be included for every Chip rate capability supported |
| Physical channel capability | MP | Physical channel capability 10.3.3.25 | |
| UE multi-mode/multi-RAT capability | MP | UE multi-mode/multi-RAT capability 10.3.3.41 | |
| Securing capability | MP | Security capability 10.3.3.37 | |
| UE positioning capability | MP | UE positioning capability 10.3.3.45 | |
| Measurement capability | CH-fdd_req_ sup | Measurement capability 10.3.3.21 | |

The first SGSN 203 decides whether to request the required information from the mobile radio subscriber appliance 201. By way of example, the first SGSN 203 can decide to request the required information from the mobile radio subscriber appliance 201 if the GSM mobile radio network 101 supports packet-switched inter-system handover, that is to say inter-system handover of a packet-switched communication link or of a packet-switched communication service to the UMTS mobile radio network. If the GSM mobile radio network 101 does not support packet-switched inter-system handover to the UMTS mobile radio network 102, then the first SGSN 107 will decide not to request the required information from the mobile radio subscriber appliance 201. In this example, however, it is assumed that the GSM mobile radio network 101 does support packet-switched inter-system handover to the UMTS mobile radio network 102.

The first SGSN 203 may also decide, by way of example, to request the required information from the mobile radio subscriber appliance 201 if the mobile radio subscriber appliance 201 is in a geographical area in which both the GSM mobile radio network 101 and the UMTS mobile radio network 102 can be used using the mobile radio subscriber appliance 103.

In this example, it is assumed that the first SGSN 203 decides to request the required information from the mobile radio subscriber appliance 201.

In step 207, the first SGSN 203 transmits an Attach Accept message 221 to the mobile radio subscriber appliance 201. The first SGSN 203 uses the Attach Accept message 221 to acknowledge to the mobile radio subscriber appliance 201 that the GPRS Attach for the mobile radio subscriber appliance 201 has been successful. In addition, the Attach Accept message 221 contains the request to the mobile radio subscriber appliance 201 for transmission of the required information to the first SGSN 203.

By way of example, the Attach Accept message 221 is in form explained in 3GPP TS 24.008 V6.7.0; 3rd Generation Partnership Project; Technical Specification Group Core Network; Mobile radio interface Layer 3 specification; Core network protocols; Stage 3 (Release 6), but additionally has the specification that the mobile radio subscriber appliance 201 needs to transmit the required information to the first SGSN 203.

To this end, the Attach Accept message 221 may contain, by way of example, an information element (IE) which is in form shown in table 1.

TABLE 1

| 8 | 7 | 6 | 5 | 4 | 3 | 2 | 1 | |
|---|---|---|---|---|---|---|---|---|
| Requested MS Information IEI | | | | UE-RAC | 0 0 0 Spare | | | octet 1 |

In this context, the value 0 of the parameter UE-RAC indicates that the required information is not being requested, and the value 1 of the parameter UE-RAC indicates that the required information is being requested.

In step 208, the mobile radio subscriber appliance 201 transmits to the first SGSN 203 an Attach Complete message 222, which is in similar form to the Attach Complete message described in 3GPP TS 24.008 V6.7.0; 3rd Generation Partnership Project; Technical Specification Group Core Network; Mobile radio interface Layer 3 specification; Core network protocols; Stage 3 (Release 6), but additionally has an inter-RAT information container containing the required information.

In this embodiment, the inter-RAT information container is an information element of type 4 based on GPP with a minimum length of 3 octets. The limitation of the maximum length is given by the maximum number of octets in an L3 message based on 3 GPP, see 3GPP TS 44.006; 3rd Generation Partnership Project; Technical Specification Group GSM EDGE Radio Access Network; Mobile Station-Base Station System (MS-BSS) interface; Data Link (DL) layer specification (Release 5). The inter-RAT information container is in form shown in table 2.

TABLE 2

| 8 | 7 | 6 | 5 | 4 | 3 | 2 | 1 | |
|---|---|---|---|---|---|---|---|---|
| Inter-RAT information container IEI | | | | | | | | octet 1 |
| Length of the inter-RAT information container | | | | | | | | octet 2 |
| Inter-RAT information container's value portion | | | | | | | | oct 3-n |

The "value portion" (see line 3 of table 2) of the inter-RAT information container is the inter-RAT Handover info as defined in 3GPP TS 25.331; 3rd Generation Partnership Project; Technical Specification Group Radio Access Network; Radio Resource Control (RRC); Protocol Specification (Release 5).

The inter-RAT information container contains the required information. The inter-RAT information container may also contain security information, for example a START PS value, that is to say an input parameter for the encryption method used, which parameter is intended to be used after inter-system handover. The inter-RAT information container may also contain further information, for example prescribed configuration information.

The first SGSN 203 stores the required information transmitted to it.

It is assumed that following the successful GPRS Attach from the mobile radio subscriber appliance 201 to the Internet 108 a packet-switched communication link is set up. When setting up the communication link, the SGSN 203 transmits the required information to the BSC 202 in step 209.

It is also assumed that the mobile radio subscriber appliance 201 is in the domain of a UMTS radio cell of the UMTS mobile radio network 102 in step 210, for example the user of the mobile radio subscriber appliance 201 has taken the mobile radio subscriber appliance 201 into a UMTS radio cell of the UMTS mobile radio network 102. The mobile radio subscriber appliance 201 performs radio measurements and measures the reception quality of the UMTS mobile radio network 102 and of the GSM mobile radio network 101 and notifies the BSC 202 of the measurement results.

In step 211, the BSC 202 takes into account the required information in deciding that the packet-switched communication link which was set up at the first SGSN 203 after the GPRS Attach for the mobile radio subscriber appliance 201 now needs to be extended using the UMTS mobile radio network 102, that is to say that a new packet-switched communication link to the Internet 108 needs to be provided using the UMTS mobile radio network 102, and the packet-switched communication link using the GSM mobile radio network needs to be cleared down.

It is thus necessary to perform inter-system handover of the packet-switched communication link from the GSM mobile radio network 101 to the UMTS mobile radio network 102.

By way of example, a decision is made that the packet-switched communication link to the Internet 108 now needs to be provided using the UMTS mobile radio network 102, since in this way a higher data transmission rate is possible than when using the GSM mobile radio network 101. The movement of the mobile radio subscriber appliance 103 may also mean that the reception quality of the GSM mobile radio network 101 has become so poor that the measurement results of the radio measurements are taken as a basis for deciding that inter-system handover to the UMTS mobile radio network 102 needs to be performed. In addition, it is possible that the user of the mobile radio subscriber appliance 201 wishes to use a communication service which can be provided only using the UMTS mobile radio network 102.

On the basis of the decision that inter-system handover needs to be performed, the BSC 202 sends a first handover request message 223 to the SGSN 203, which is used to request inter-system handover of the existing packet-switched communication link from the GSM mobile radio network 101 to the UMTS mobile radio network 102.

In step 212, the SGSN 203 sends a second handover request message 224 to the RNC 205, which is used to ask the RNC 205 to make the necessary preparations for the inter-system handover.

In particular, a second radio communication link needs to be set up from the mobile radio subscriber appliance 201 to the UMTS mobile radio network 102, so that the packet-switched communication link can in the future be provided by means of the second SGSN 113 and the UMTS mobile radio network 102.

It is assumed that a decision is made that the second radio communication link needs to be cleared down using the NodeB 111 (for example because the mobile radio subscriber appliance has moved into the domain of the NodeB 111).

The second handover request message 224 contains the required information, which is transmitted to the RNC 205 in this way.

In step 213, the second RNC 205 takes into account the required information in reserving radio resources for the second radio communication link and acknowledges the second handover request message 224 using a first acknowledgement message 225.

In step 214, the first SGSN 203 sends a first Handover Command message 226 to the BSC 202. The BSC 202, for its part, transmits a second Handover Command message 227 to the mobile radio subscriber appliance 201 in step 215.

In step 216, the mobile radio subscriber appliance transmits a Handover Complete message 228 to the RNC 205 in order to acknowledge that it is now using the second radio communication link for the data transmission.

In the embodiment described, the required information is requested by the first SGSN 203 as part of the GPRS Attach for the mobile radio subscriber appliance 201 (Attach Accept message 221), and the required information is also transmitted to the first SGSN 203 as part of the GPRS Attach (Attach Complete message 222).

In another embodiment, the required information is requested and transmitted as part of a Routing Area Update. In a similar fashion to the Attach Request message 220, the mobile radio subscriber appliance 201 transmits a Routing Area Update Request message as part of a Routing Area Update procedure. This is described in 3GPP TS 24.008 V6.7.0; 3rd Generation Partnership Project; Technical Specification Group Core Network; Mobile radio interface Layer 3 specification; Core network protocols; Stage 3 (Release 6). The first SGSN 203 responds to the Routing Area Update Request message with a Routing Area Update Accept message, which is essentially in a form as in 3GPP TS 24.008 V6.7.0; 3rd Generation Partnership Project; Technical Specification Group Core Network; Mobile radio interface Layer 3 specification; Core network protocols; Stage 3 (Release 6), but in this embodiment contains the request to the mobile radio subscriber appliance 201 to transmit the required information to the first SGSN 203.

The mobile radio subscriber appliance 201 then responds with a Routing Area Update Complete message, which is in the form described in 3GPP TS 24.008 V6.7.0; 3rd Generation Partnership Project; Technical Specification Group Core Network; Mobile radio interface Layer 3 specification; Core network protocols; Stage 3 (Release 6) but additionally contains the required information.

In other embodiments, a hybrid form of the procedures described above is used for requesting and transmitting the required information. By way of example, the first SGSN 203 requests transmission of the required information from the mobile radio subscriber appliance using a Routing Area Accept message, and the mobile radio subscriber appliance 201 transmits the required information as part of a GPRS Attach using a Routing Area Update Complete message.

In addition to the required information being requested and transmitted as part of a registration signaling procedure such as a Routing Area Update and a GPRS Attach, the required information may also be requested and transmitted as part of a different procedure. By way of example, one embodiment defines a new GMM (GPRS Mobility Management) procedure in comparison with the prior art, which procedure involves the required information being requested by the first SGSN 203 and being transmitted from the mobile radio subscriber appliance 201 to the first SGSN 203.

This new GMM procedure is carried out when a predetermined event occurs or when a predetermined criterion has been met. An example of a predetermined event of this type is when the mobile radio subscriber appliance 201 moves into a geographical area in which both the GSM mobile radio network 101 and the UMTS mobile radio network 102 are available, that is to say that radio communication links can be set up both to the GSM mobile radio network 101 and to the UMTS mobile radio network 102.

In one embodiment, the mobile radio subscriber appliance receives signaling determining whether the GSM mobile radio network 101 supports inter-system handover to the UMTS mobile radio network 102.

By way of example, this is done using an Information Request message containing an information element (IE), for example, which is in the form shown in table 1. The mobile radio subscriber appliance then transmits in an Information Provision message which has an inter-RAT information container containing the required information.

In this embodiment, the inter-RAT information container is an information element of type 4 based on GPP with a minimum length of 3 octets. The limitation of the maximum length is given by the maximum number of octets in an L3 message based on 3 GPP, see 3GPP TS 44.006; 3rd Generation Partnership Project; Technical Specification Group GSM EDGE Radio Access Network; Mobile Station-Base Station System (MS-BSS) interface; Data Link (DL) layer specification (Release 5). The inter-RAT information container is in the form shown in table 2.

What is claimed is:

1. A mobile radio communication system comprising:
    a mobile radio communication network having a radio access network and a core network; and
    a mobile radio subscriber appliance,
    wherein a unit in the network layer of the core network is configured to transmit to the mobile radio subscriber appliance a first message, based on an occurrence of a predetermined event, with a request for a statement describing specific information required for inter-system handover, and
    wherein the mobile radio subscriber appliance is configured to transmit to the unit a second message with a statement describing specific information required for inter-system handover requested by the unit in the network layer of the core network.

2. The mobile radio communication system as claimed in claim 1, wherein the specific information is of the mobile radio subscriber appliance.

3. The mobile radio communication system as claimed in claim 1, wherein the predetermined event is a registration of the mobile radio subscriber appliance in the core network.

4. The mobile radio communication system as claimed in claim 1, wherein the unit in the network layer is further configured to store the statement describing the specific information required for an inter-system handover.

5. The mobile radio communication system as claimed in claim 1, further comprising:
    a further mobile radio communication network having a further radio access network and a further core network, wherein the further core network comprises a further unit in the network layer.

6. The mobile radio communication system as claimed in claim 5, wherein the unit in the network layer is also configured to transmit to a further unit in the network layer of the further core network the statement describing the specific information required for an inter-system handover upon inter-system handover of the mobile radio subscriber appliance.

7. The mobile communication system as claimed in claim 6, wherein the unit in the network layer or the further unit in the network layer of the further core network is further configured to transmit to a radio network controller (RNC) a third message requesting an intersystem handover based on the specific information from the statement.

8. The mobile radio communication system as claimed in claim 5, wherein the further mobile radio communication network is designed based on the UMTS Standard.

9. The mobile radio communication system as claimed in claim 8, wherein the predetermined event is activation of the mobile radio subscriber appliance at the SGSN.

10. The mobile radio communication system as claimed in claim 5, wherein the unit in the network layer and the further unit in the network layer of the further core network is a shared unit.

11. The mobile communication system as claimed in claim 10, wherein the shared unit is further configured to transmit to the unit in a further radio access network a third message requesting an intersystem handover based on the specific information from the statement.

12. The mobile radio communication system as claimed in claim 1, wherein the mobile radio communication network is designed based on the GSM Standard.

13. The mobile radio communication system as claimed in claim 1, wherein the unit in the network layer is an SGSN.

14. The mobile radio communication system as claimed in claim 1, further comprising:
    a further mobile radio communication network having a further core network and a further radio access network, wherein the unit in the network layer is also configured to, upon inter-system handover of the mobile radio subscriber appliance, transmit to a further unit in the network layer of the further core network specific information required for an inter-system handover from the statement.

15. The mobile radio communication system as claimed in clam 1, wherein the specific information comprises an access stratum release indicator.

16. The mobile radio communication system as claimed in claim 1, wherein the specific information comprises DL capability with simultaneous HS-DSCH configuration.

17. The mobile radio communication system as claimed in claim 1, wherein the specific information comprises PDCP capability.

18. The mobile radio communication system as claimed in claim 1, wherein the specific information comprises RLC capability.

19. The mobile radio communication system as claimed in claim 1, wherein the specific information comprises transport channel capability.

20. The mobile radio communication system as claimed in claim 1, wherein the specific information comprises RF capability FDD.

21. The mobile radio communication system as claimed in claim 1, wherein the specific information comprises RF capability TDD.

22. The mobile radio communication system as claimed in claim 1, wherein the specific information comprises physical channel capability.

23. The mobile radio communication system as claimed in claim 1, wherein the specific information comprises UE multi-mode/multi-RAT capability.

24. The mobile radio communication system as claimed in claim 1, wherein the specific information comprises securing capability.

25. The mobile radio communication system as claimed in claim 1, wherein the specific information comprises UE positioning capability.

26. The mobile radio communication system as claimed in claim 1, wherein the specific information comprises measurement capability.

27. An apparatus, comprising:
    a mobile radio subscriber appliance configured to:
        receive a first message including a request for a statement describing specific information required for inter-system handover, the first message being sent by a unit in a network layer of a core network responsive to a registration request of the mobile radio subscriber or responsive to a routing area update request of the mobile radio subscriber; and
        transmit, responsive to the first message, a second message to said unit in the network layer of said core network with a statement describing the specific information required for inter-system handover.

28. The apparatus as claimed in claim 27, wherein the specific information is of a mobile radio subscriber appliance.

29. The apparatus as claimed in claim 27, wherein the registration request comprises initiation of a GPRS Attach procedure by the mobile radio subscriber appliance.

30. The apparatus as claimed in claim 27, wherein the registration request comprises initiation of a Registration Area Update procedure by the mobile radio subscriber appliance.

* * * * *